US009675918B2

(12) United States Patent
Loh et al.

(10) Patent No.: US 9,675,918 B2
(45) Date of Patent: Jun. 13, 2017

(54) CENTRIFUGAL CYCLONE SEPARATOR

(75) Inventors: Chee Hoong Loh, Singapore (SG); Heng Yuan Paul Lau, Singapore (SG); Boon Ping Justin Cheng, Sinapore (SG); Yi Yu Lin, Taipei (TW)

(73) Assignee: PRACTICAL ANALYZER SOLUTIONS PTE. LTD., Singapore (SG)

( * ) Notice: Subject to any disclaimer, the term of this patent is extended or adjusted under 35 U.S.C. 154(b) by 234 days.

(21) Appl. No.: 14/412,162

(22) PCT Filed: Jul. 6, 2012

(86) PCT No.: PCT/SG2012/000243
§ 371 (c)(1),
(2), (4) Date: Dec. 30, 2014

(87) PCT Pub. No.: WO2014/007755
PCT Pub. Date: Jan. 9, 2014

(65) Prior Publication Data
US 2015/0151231 A1 Jun. 4, 2015

(51) Int. Cl.
*B01D 45/16* (2006.01)
*B04C 5/06* (2006.01)
(Continued)

(52) U.S. Cl.
CPC ............... *B01D 45/16* (2013.01); *B04C 5/06* (2013.01); *B04C 5/103* (2013.01); *B04C 5/107* (2013.01);
(Continued)

(58) Field of Classification Search
CPC ...... B01D 45/12; B01D 45/16; B01D 29/908; B04C 5/06; B04C 5/103; B04C 5/107; B04C 5/13; B04C 5/181; B04C 5/26
See application file for complete search history.

(56) References Cited

U.S. PATENT DOCUMENTS 2,707,000 A * 4/1955 Peeps .................... B01D 45/12
137/590
2,936,043 A 5/1960 Armstrong et al.
(Continued)

FOREIGN PATENT DOCUMENTS

EP        0 436 973 A2    7/1991
WO         97/42275 A1    11/1997
WO      2009/006672 A1    1/2009

OTHER PUBLICATIONS

International Search Report of PCT/SG2012/000243, mailed Oct. 4, 2013.
(Continued)

Primary Examiner — Robert Clemente
(74) Attorney, Agent, or Firm — Collard & Roe, P.C.

(57) ABSTRACT

At least one embodiment of the invention relates to a centrifugal/cyclone separator which separates particles, liquid droplets and or condensing mists (water based and or hydrocarbon based nature) from gases without using a filter element. The design relies on the use of the inlet spiral tube, a first conical fin and the second conical fin, and the step on the cylindrical body and the extension of the vortex finder below second conical fin. With another embodiment, the design differs in that it relies on the insert with threaded or open area forming a flow path like spiral tube, while relying on the same or similar components as with the first embodiment listed above.

22 Claims, 3 Drawing Sheets

(51) Int. Cl.
  *B04C 5/103*   (2006.01)
  *B04C 5/107*   (2006.01)
  *B04C 5/13*    (2006.01)
  *B04C 5/181*   (2006.01)
  *B04C 5/26*    (2006.01)

(52) U.S. Cl.
  CPC ................ *B04C 5/13* (2013.01); *B04C 5/181* (2013.01); *B04C 5/26* (2013.01)

(56) References Cited

U.S. PATENT DOCUMENTS

| | | | | |
|---|---|---|---|---|
| 3,646,724 | A * | 3/1972 | Peck | B01D 45/12 138/114 |
| 5,129,931 | A * | 7/1992 | Oranje | B01D 45/16 55/399 |
| 5,869,008 | A | 2/1999 | Dewitz | |
| 6,958,107 | B1 * | 10/2005 | Clarke | B01D 3/08 159/17.1 |
| 2002/0011053 | A1 * | 1/2002 | Oh | A47L 9/1683 55/426 |
| 2002/0178701 | A1 * | 12/2002 | Oh | B01D 45/16 55/337 |
| 2007/0084340 | A1 | 4/2007 | Dou et al. | |

OTHER PUBLICATIONS

International Preliminary Report on Patentability of PCT/SG2012/000243, mailed Sep. 10, 2014.

* cited by examiner

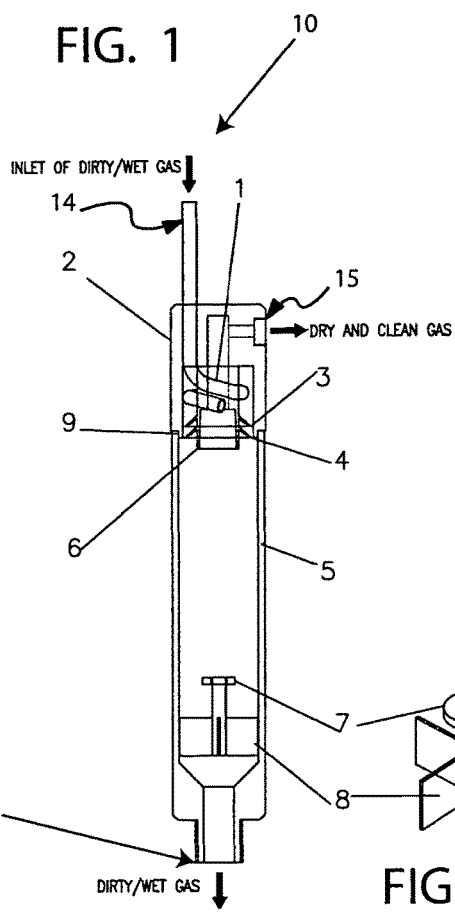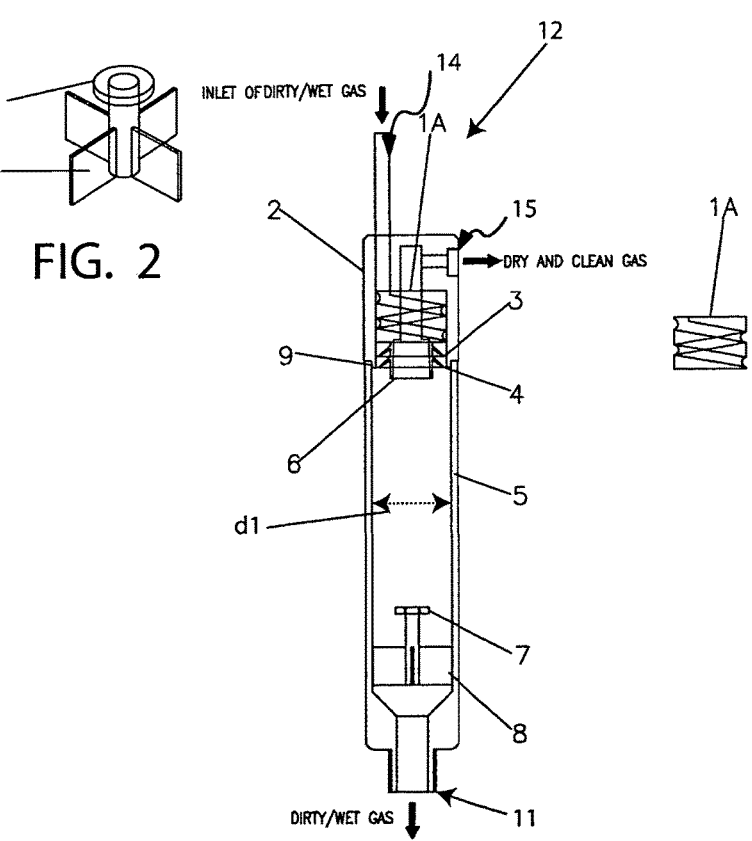

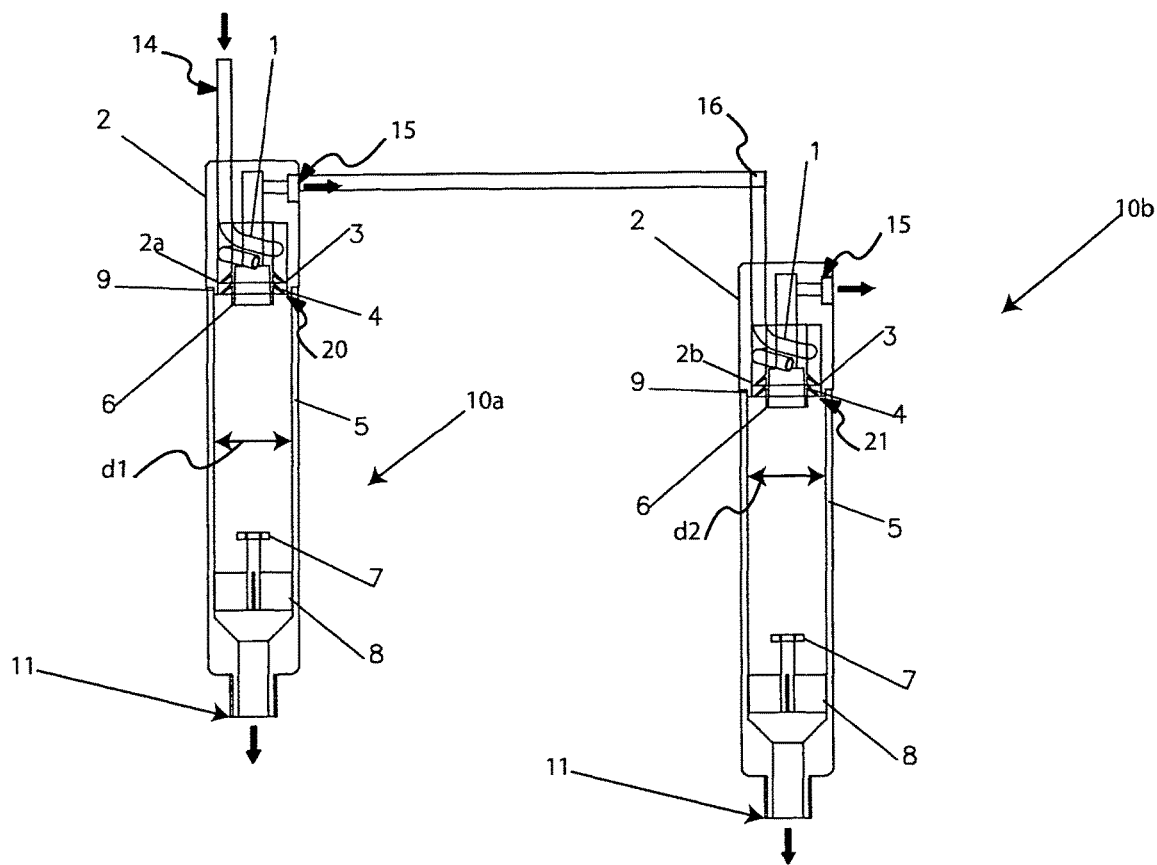

CENTRIFUGAL CYCLONE SEPARATOR

CROSS REFERENCE TO RELATED APPLICATIONS

This application is the National Stage of PCT/SG2012/000243 filed on Jul. 6, 2012, the disclosure of which is incorporated by reference. Priority of PCT/SG2012/000243 is being claimed.

BACKGROUND OF THE INVENTION

At least one embodiment of the invention is a centrifugal/cyclone separator which separates particles, liquid droplets and or condensing mists (water based and or hydrocarbon based nature) from gases without using a filter element.

Generally, filters or some cyclone/centrifugal separators having a coalescing filter element have at least one drawback. The coalescing filter element is choked quickly due to their small pore size and resulted in high maintenance.

A coalescing filter is used in conjunction with membrane filter to remove particles, liquid droplets and fine mists from gases. However, these filters are choked up quickly due to their small pore size and can only provide very short term service interval ranging from a few days to 2 weeks resulting in very high maintenance and replacement costs. Our separator is expected to operate maintenance-free since it does not make use of any filter element.

European Patent No. EP-0436973A2 discloses a separator of liquids and/or solid from a gas stream. That application discloses a device for the separation of liquids and/or solids from a gas stream, comprising a cylindrical vessel with a virtually vertically set axis, provided with: a top compartment to which the gas stream is supplied; a middle compartment comprising a number of blades shaped helicoidally around the axis; a bottom compartment for the separation of the liquid and/or solids and a coaxial gas discharge pipe projecting upwards from the bottom compartment through the middle and top compartments, around which the helicoidal blades are fixed, in which bottom compartment at least one plate with a circular outer rim is provided perpendicularly to the axis of the vessel and under the gas discharge pipe, at least one diametrical baffle being provided beneath the bottom plate, the overall height of each baffle being at least 1.0 times the internal diameter of the vessel.

However EP0436973A2, does not disclose the following different features of the different claims disclosed herein:
1) a separator is configured to separate at a rate of up to 20 l/h for fluid flow rate or 2000 Nl/h for gas flow rate;
2) a separator assembly comprising a first separator and a second separator wherein the separators are configured to separate particles in a condensing mist of up to 10 microns in size;
3) a process wherein the separator is configured to separate particles of up to 10 microns in size;
4) a separator characterized in that said at least one separator element comprises a first conical fin, and a second conical fin (4) disposed adjacent to said first conical fin (3) wherein said housing has an inner wall (20) and wherein said first conical fin and said second conical fin is spaced from said inner wall of said housing by 0.5 mm to 2 mm.
5) a separator system having two different separators coupled together via a conduit.

Therefore for each of the above independent reasons, the claimed inventions are patentable in view of EP0436973A2.

For example, cyclone/centrifugal separators are used in high flow rate applications and not low flow rate applications. When this is used in conjunction with a coalescing filter, the filter element is choked up very quickly and requires very high maintenance. Therefore, there is a need for a centrifugal cyclone separator which does not have a coalescing filter element.

SUMMARY OF THE INVENTION

At least one embodiment of the invention relates to a centrifugal/cyclone separator which separates particles, liquid droplets and or condensing mists (water based and or hydrocarbon based nature) from gases without using a filter element. With at least one embodiment of the present invention, the centrifugal/cyclone separator can separate particles and or liquid droplets and condensing mists (water and or hydrocarbon) from gases without using a filter element and can operate optimally on low gas flow rate from 30 l/h up to 150 Nl/h (Normal L/h). This embodiment is also able to separate fine particles and condensing mists up to 5 to 10 micron size which is attributed to the combined effect of the use of an inlet spiral tube, a first conical fin and a second conical fin. In addition, it is also attributable to the cylindrical body and the extension of the vortex finder below the second conical fin.

The separator is specially designed to work optimally on low pressure and low gas flow rate from 30 l/h up to 150 Nl/h and is able to separate fine particles/mists between 5 to 10 micron size. It is also designed to separate up to a maximum of 20 l/h of liquid flow or 2000 Nl/h gas flow or a maximum of 40 l/h of liquid flow or 1000 Nl/h of gas flow. The separator can work at low pressure close to atmospheric pressure or up to 100 barg (barg=pressure in bars above ambient or atmospheric pressure) pressure.

The present invention is an innovative break-through for applying cyclonic/centrifugal separator under low gas flow rate from 30 Nl/h to 500 Nl/h. It does not require a filter element and can separate particles droplets condensing mists between 5-10 micron or less than 1 micron with cooler or liquid injection. It provides a robust and maintenance-free solution as compared to that of coalescing filter and membrane filters which provides service interval of a few days to two (2) weeks due to chokage of the fine pores. Many critical process gas analyzers which are used for quality and safety control in the process plants are often destroyed or make unavailable due to carry-over or chokage of the traditional coalescing filter and membrane filter.

One reason why the centrifugal/cyclone separator of the present invention can separate particles and or liquid droplets and condensing mists (water and or hydrocarbon) from gases without using a filter element, and can operate optimally on low gas flow rate from 30 l/h up to 150 Nl/h and is able to separate fine particles and condensing mists up to 5 to 10 micron size is attributed to the combined effect of one or more of the components of the separator. These components can include one or more of an inlet spiral tube, at least one conical fin, a step in the cylindrical body, and the extension of the vortex finder below the conical fin.

BRIEF DESCRIPTION OF THE DRAWINGS

Other objects and features of the present invention will become apparent from the following detailed description considered in connection with the accompanying drawings which disclose at least one embodiment of the present invention. It should be understood, however, that the drawings are designed for the purpose of illustration only and not as a definition of the limits of the invention.

In the drawings, wherein similar reference characters denote similar elements throughout the several views:

FIG. 1 is an open side view of a first embodiment of the invention;

FIG. 2 is a side view of the stopper plate for use in both the first and second embodiments of the invention; and FIG. 3 is an open side view of a second embodiment of the invention;

FIG. 4 is a view of two separators in series; and

DETAILED DESCRIPTION OF PREFERRED EMBODIMENTS

Figure 5:
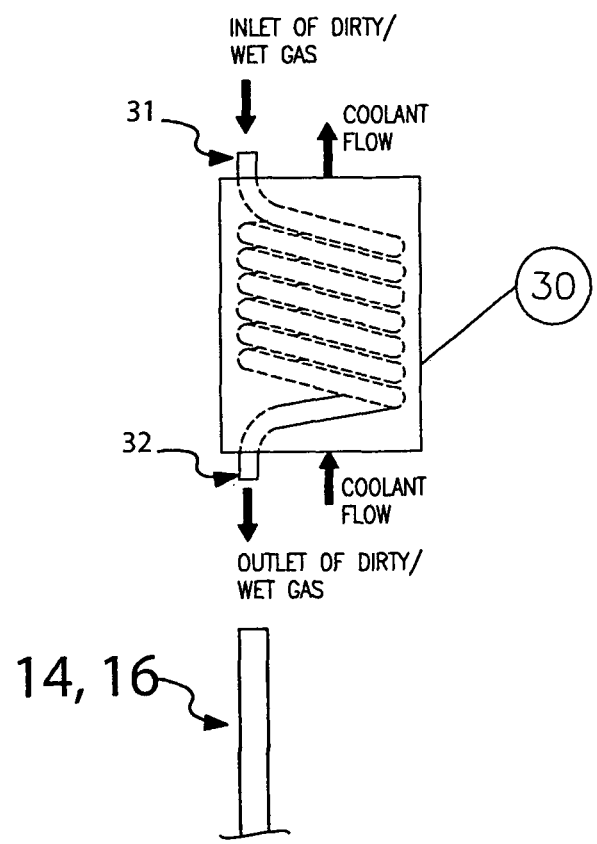
FIG. 5 is a side view of a cooler which can be optionally coupled to either an inlet of a first separator and/or an inlet of a second separator.

Turning in detail to the drawings, FIG. 1 shows a first embodiment of a separator 10 which includes an inlet tube 1. Cyclonic/centrifugal separators have been used widely for separation of particles, liquid droplets and or condensing mists from gases under high gas flow rate involving at least $Nm^3/h$ gas flow rate in order to generate sufficient high centrifugal/cyclone forces. The dirty/wet gas enters the separator from the top via the inlet tube 1. This inlet tube 1 is coiled spirally downwards to create centrifugal/cyclone forces to separate the particles, liquid droplets and or condensing mists from the gas. This tube stops above the conical fin 3 which is located above the second conical fin 4.

Separator 10 has an inlet spiral tube 1 which has a small inner bore to generate high gas flow velocity leading to high centrifugal/cyclonic forces inside the top cylindrical housing 2 for effective separation. The tube 1 also guides the gas, liquid droplets, and or condensing mists smoothly from the outside of the separator spirally downwards. This is an excellent key feature which meets the requirement of cyclone inlet geometry to provide a smooth flow with minimum turbulent and minimum erosion. It is vital that the cyclone separator inlet geometry separation minimizes turbulence in the gas flow which can create new liquid mists splashing or particles turbulent flow resulting in carry over to the clean and dry exist gas.

The other embodiment, that of separator 12 has an insert 1A having a threaded area forming a flow path which functions like a spiral tube. This insert can comprise a cylindrical block of material having a spiral path.

First and second conical fins 3 and 4 function to push the gas particles, liquid droplets, and or condensing mists close to the cylindrical wall of the top housing 2. Upon exiting the second conical fin 4 there is a step, ridge or protrusion 9 where the particles liquid droplets and or mists enters cylindrical body 5 which is of bigger inner diameter (see line d2) from that of the top cylindrical housing. The gas, particles, liquid droplets and or mists continue to flow spirally downwards tangentially in the cylindrical body. The tail end of the cyclonic gas flow rests on top of the vortex breaker 7 where the clean and dry gas spirals axially upwards towards the vortex finder 6 and exit from the top right side of the separator through gas outlet tube 15. The particles, liquid droplets and or condensing mists continue to spiral beyond the vortex breaker and then their swirling movement is stopped by the swirl stopper plates 8. The particles, liquid droplets mists and or some gas then exit the separator from the bottom side 11.

First and second conical fins 3 and 4 force the gases, liquids droplets and mists to coalesce/collide together to form larger size liquid droplets and larger size particles for effective subsequent cyclonic/centrifugal separation. The gaps between the first and second conical fins 3 and 4 and the inner wall of 2 the top cylindrical housing can be made relatively small. For example, this dimension can be any suitable dimension, wherein different examples can include a range from 0.5 mm to 1 mm (millimeters) or even up to 2 mm to enhance the compression and coalescing/collision effect. The edges of the first and second conical fins 3 and 4 are sharp or substantially sharp or at least sufficiently sharp to ensure clean dislodge of the gas, liquids and particles mixture and also to ensure minimum restriction to gas flow.

Step, ridge or protrusion 9 is disposed at the joint between the top cylindrical housing 2 and the cylindrical body 5. Step 9 ensures that liquid droplets, particles and or condensing mists dislodge cleanly and outwardly from the second conical fin 4 to avoid re-entrainment or creep flow around to the vortex finder 6 resulting in carry over with the existing clean and dry gas. The vortex finder 6 also extends below second conical fin 4 for the same purpose.

Lastly, two separators can be used in series to provide coarse and fine separation to avoid overloading the first separator. With this design, the gaps between first conical fin 3 and second conical fin 4 and the inner wall of the top cylindrical housing 2 of the first separator is usually bigger than that of the second separator. This configuration is shown in FIG. 4 which shows two separators 10a and 10b shown aligned in series with each other so that the material can make a pass through two different separators. With this design, the first separator 10a in the series would have the larger gap between the first conical fin 3, the second conical fin 4 and the inner wall shown here as 20 in separator 10a than the gap 21 between conical fin 3, and second conical fin 4 and wall 2b in separator 10b. As shown in this diagram, the processed gasses exit from exit port 15 and enter into port 16 on separator 10b. In this way, the gasses are processed twice so that there is sufficient separation of particles from the gasses.

To enhance separation efficiency, two separators can be used in series to guarantee separation performance where the first separator can be used for coarse separation while the second separator for fine separation without overloading the first separator. For separation of very fine mists or particles of less than 5 or smaller micron size in a very dry gas, a cooler shall be used in conjunction with the separator to create small amount of liquid condensate which forms liquid droplets or liquid film which can allow fine particles, mists to stick onto due to adhesion.

For separation of very fine mists or particles of less than 1 micron, the device can include a cooler 30 made up of a tube coil where fine mists can be adhered onto the liquid film due to centrifugal forces inside the tube coil and allows other mists/particles to adhere to. As shown in FIG. 5, the cooler 30 has an inlet 31 and an outlet 32 that can be connected to inlet spiral tube 14 of first separator or inlet spiral tube 16 of the $2^{nd}$ separator. The cooler 30 serves to form liquid condensation which will create a liquid film for fine mists/fine particles to adhere onto before the separator. In at least one embodiment, the cooler is separate from the separator because the flow velocity in the separator is too fast and the residence time is too short to create the desired results.

The reason why the centrifugal/cyclone separator can separate particles liquid droplets condensing mists (water based and or hydrocarbon based nature) from gases without using a filter element, and can operate optimally at low gas flow rate from 30 l/h up to 150 Nl/h, and is able to separate fine particles condensing mists up to 5 to 10 micron size is attributed to the combined effect of the components listed above. For example, with the first embodiment, the design relies on the use of the inlet spiral tube 1, the first conical fin 3 and the second conical fin 4, and the step 9 on the cylindrical body and the extension of the vortex finder below second conical fin 4. With the second embodiment, the design differs in that it relies on the insert 1A with threaded area forming a flow path like spiral tube, while relying on the same or similar components as with the first embodiment listed above.

The combined effect of these key components is an excellent separator geometry which ensures very smooth non-turbulent, high velocity flow rate which generates high centrifugal/cyclonic action for separation. There is also low restriction to low gas flow. excellent compression and collision/coalescing of fine condensing mists and particles with liquid droplets and large particles to create larger size droplets/particles for effective separation by the first and second conical fins 3 and 4. Finally, the sharp edges of the first and second conical fins 3 and 4, the step 9 at the joint between the top cylindrical housing and the cylindrical body and the extension of the vortex finder below the second conical fin 4 all ensure clean dislodge and outwardly separation of particles liquid droplets and condensing mists and gas to prevent carry-over to the existing clean and dry gas.

The length of cylindrical body 5 can be shortened to improve residence time inside the separator without affecting the separation efficiency.

The gaps between the conical fins 3 and 4 and the inner diameter of top cylindrical housing 2 can be increased up to 2 mm if the size of the largest particle is expected to be around 1+mm for coarse separation such as shown in the embodiment 10A in FIG. 4. The overall diameter and dimension of the separator can be increased proportionally to maintain steps and thickness of the top cylindrical housing and the cylindrical body. The thickness of the top cylindrical housing 2 and cylindrical body can be increased to cope with higher pressure and temperature as required for mechanical strength. However, the internal dimensions of the mentioned key features shall not be reduced. The length of the spiral coil can be increased or decreased slightly without affecting the separation efficiency.

The first embodiment of the separator comprises an inlet spiral tube 1 which has a small inner bore to generate high gas flow velocity leading to high centrifugal/cyclonic forces inside the top cylindrical housing 2 for effective separation. It is also designed to separate up to a maximum of 20 l/h of liquid flow from 2000 Nl/h gas flow or maximum of 40 l/h from 1000 Nl/h gas flow.

At least one embodiment uses a step 9 positioned at the joint between the top cylindrical housing 2 or first section or first body to the second portion of the housing or second cylindrical body 5 to ensure that liquid droplets, particles and or mists dislodge cleanly and outwardly from the second conical fin 4 to avoid re-entrainment or surface flow around to the vortex finder 6 resulting in carry over with the existing clean and dry gas. The vortex finder 6 also extends 5 mm below the second conical fin 4 for the same purpose.

Lastly, small amount of water or hydrocarbon liquid spray can also be added with the inlet dry and dirty gas to create liquid droplets or films for the fine mist and fine particles to adhere onto.

The materials listed above, particularly the first body section 2, and the second body section 5 of the housing, the spiral tube 1, the insert 1A, the conical fin 3, the conical fin 4, the vortex finder 6, the vortex breaker 7, the swirl stopper plate 8, and the step 9, can be made from any suitable material such as but not limited to Stainless Steel, corrosion resistant metal or alloys, PTFE, Polycarbonate or other hard plastic that is mechanically strong to withstand the operating pressure and chemically resistant.

In all, the design allows for a filterless separator or a separator having no coalescing filter using the geometry of the components listed above. This creates a device that does not need to be serviced as much and does not need numerous filter replacements as well. Thus, the components as described above create a cyclone in the gas using a spiral feed mechanism or spiral mechanism such as tube 1 or component 1A to create a separating cyclonic effect in the gas. The more dense particles (and mists) are pushed towards the edge of the housing where they (collide and) condense. The separator elements or fins 3 and 4 are configured to push these components towards the wall of the housing where they will coalesce or condense. These condensed particles then drop towards the outlet 11 while the remaining uncondensed portion of the gas is driven against the vortex breaker 7 and sent up into the vortex finder 6 wherein the remaining gas is passed up and out of the separator out from outlet port 15. In this way gasses are separated from liquid or solid material without the need for a filter that would otherwise need to be replaced.

Accordingly, while at least one embodiment of the present invention have been shown and described, it is to be understood that many changes and modifications may be made thereunto without departing from the spirit and scope of the invention as defined in the appended claims.

What is claimed is:

1. A separator for use with a gas or a liquid comprising:
    a) at least one housing comprising at least one inlet and at least one outlet wherein said housing comprises a first body section and a second body section, said inlet being coupled to said first body section, and said outlet being coupled to said second body section and wherein said first body section is narrower than said second body section;
    b) at least one spiral mechanism configured to cause the gas or the liquid to spiral within said housing;
    c) at least one separator element disposed adjacent to said at least one spiral mechanism and configured to further separate particles from the gas or the liquid wherein said separator is configured to separate at a rate of up to 20 l/h for fluid flow rate or 2000 Nl/h for gas flow rate.

2. The separator as in claim 1, wherein said housing comprises a cylinder having a substantially hollow inner region.

3. The separator as in claim 1, wherein said spiral mechanism comprises at least one spiral tube.

4. The separator as in claim 1, wherein said spiral mechanism comprises at least one insert having a threaded area forming a flow path.

5. The separator as in claim 1, wherein said spiral mechanism comprises an insert comprising a substantially cylindrical block of material having a spiral path.

6. The separator as in claim 1, wherein said at least one separator element comprises a substantially conical fin.

7. The separator as in claim 1, wherein said at least one separator element comprises a first conical fin, and a second conical fin disposed adjacent to said first conical fin.

8. The separator as in claim 1, further comprising a step, coupled to said housing, said step formed in a region where said second body section meets said first body section.

9. The separator as in claim 1, wherein said step is positioned adjacent to said first body section and adjacent to said at least one separator element.

10. The separator as in claim 1, further comprising a vortex finder extending from said first body section to said second body section.

11. The separator as in claim 10, further comprising a vortex breaker positioned downstream from said vortex finder, in said second body section.

12. The separator as in claim 11, further comprising a swirl stopper plate configured to interrupt a swirling flow of fluid and/or gasses inside the housing.

13. The separator as in claim 12, wherein said swirl stopper plate is positioned adjacent to said outlet in said second body section.

14. The separator as in claim 7, wherein said housing has an inner wall and wherein said first conical fin and said second conical fin is spaced from said inner wall of said housing by 0.5 mm to 2 mm.

15. The separator as in claim 1, further comprising a vortex breaker, wherein said spiral mechanism is disposed adjacent to said inlet and said vortex breaker is disposed adjacent to said outlet.

16. The separator as in claim 1, wherein said separator is configured to separate particles in a condensing mist of up to 10 microns in size.

17. The separator as in claim 1, further comprising a cooler having an outlet coupled to said inlet of said separator and configured to cool the input of gasses or liquid into the separator.

18. A separator assembly comprising: a first separator comprising:
   a) at least one housing comprising at least one inlet and at least one outlet wherein said housing comprises a first body section and a second body section, said inlet being coupled to said first body section, and said outlet being coupled to said second body section and wherein said first body section is narrower than said second body section;
   b) at least one spiral mechanism configured to cause gas or liquid to spiral within said housing;
   c) at least one separator element disposed adjacent to said at least one spiral mechanism and configured to further separate particles;
   a second separator comprising:
   a) at least one housing comprising at least one inlet and at least one outlet;
   b) at least one spiral mechanism configured to cause gas or liquid to spiral within said housing;
   c) at least one separator element disposed adjacent to said at least one spiral mechanism and configured to further separate particles;
   wherein said separator element of said second separator is spaced from said housing at a distance smaller than a distance that said separator element of said first separator is spaced from said housing of said first separator;
   wherein said first separator and said second separator are in fluid communication with each other.

19. A process for separating material comprising a gas and at least one of a solid and/or a liquid comprising;
   a) introducing the material to be separated into a separator;
   b) passing the material to be separated into at least one spiral mechanism to create a cyclonic effect;
   c) passing said material to be separated through a separator element comprising a plurality of fins which are configured to create a collision effect to condense particles of the material to be separated into at non-gaseous form;
   d) passing said material past a step inside of said housing so that said material to be separated in non gaseous form separate from said separator element;
   e) removing at least some of said material to be separated in non gaseous form from at least some of a remaining gas;
   f) expelling at least some of said non gaseous material to be separated from the separator from a first outlet port; and
   g) expelling at least some of said gaseous material to be separated from a second outlet port which results in said separator being configured to separate particles in a condensing mist of up to 10 microns in size.

20. The process as in claim 19, wherein said separator is configured to separate at a rate of up to 20 l/h for fluid flow rate or 2000 Nl/h for gas flow rate.

21. The process as in claim 19, wherein said separator comprises a housing wherein said housing has an inner wall and wherein said step of passing said material through a separator element comprises passing the material through a separator element that has a first conical fin and a second conical fin which are spaced from said inner wall of said housing by 0.5 mm to 2 mm.

22. A separator for use with a gas or a liquid comprising:
   a) at least one housing comprising at least one inlet and at least one outlet wherein said housing comprises a first body section and a second body section, said inlet being coupled to said first body section, and said outlet being coupled to said second body section and wherein said first body section is narrower than said second body section;
   b) at least one spiral mechanism configured to cause the gas or the liquid to spiral within said housing;
   c) at least one separator element disposed adjacent to said at least one spiral mechanism and configured to further separate particles from the gas or the liquid.

* * * * *